United States Patent
Jensen et al.

(10) Patent No.: US 12,359,086 B2
(45) Date of Patent: Jul. 15, 2025

(54) METHOD FOR COATING A BUILDING PANEL AND A BUILDING PANEL

(71) Applicant: VÄLINGE PHOTOCATALYTIC AB, Viken (SE)

(72) Inventors: Henrik Jensen, Olstykke (DK); Theis Reenberg, Copenhagen (DK); Göran Ziegler, Viken (SE)

(73) Assignee: VALINGE PHOTOCATALYTIC AB, Viken (SE)

( * ) Notice: Subject to any disclaimer, the term of this patent is extended or adjusted under 35 U.S.C. 154(b) by 0 days.

(21) Appl. No.: 18/309,076

(22) Filed: Apr. 28, 2023

(65) Prior Publication Data

US 2023/0264226 A1    Aug. 24, 2023

Related U.S. Application Data

(60) Division of application No. 14/654,203, filed as application No. PCT/SE2013/051604 on Dec. 20, (Continued)

(30) Foreign Application Priority Data

Dec. 21, 2012 (SE) .................................. 1251483-2

(51) Int. Cl.
*C09D 15/00* (2006.01)
*B05D 1/02* (2006.01)
(Continued)

(52) U.S. Cl.
CPC ............... *C09D 15/00* (2013.01); *B05D 1/02* (2013.01); *B05D 3/007* (2013.01); *B05D 3/067* (2013.01);
(Continued)

(58) Field of Classification Search
CPC . C09D 15/00; C09D 7/61; B05D 1/02; B05D 3/007; B05D 3/067; B05D 5/00;
(Continued)

(56) References Cited

U.S. PATENT DOCUMENTS 3,798,111 A    3/1974  Lane et al.
3,932,342 A    1/1976  Nagata et al.
(Continued)

FOREIGN PATENT DOCUMENTS

BE    1015862 A6    10/2005
BE    1017168 A5    3/2008
(Continued)

OTHER PUBLICATIONS

English machine translation of JP2001-038858.*
(Continued)

*Primary Examiner* — Robert S Walters, Jr.
(74) *Attorney, Agent, or Firm* — Boone IP Law

(57) ABSTRACT

A method for coating a building panel, the method including applying a first coating fluid including an organic binder on a surface of the building panel to obtain at least one coating layer, and applying barrier components and photocatalytic particles, preferably TiO$_2$, on the at least one coating layer. Also, such a building panel.

8 Claims, 4 Drawing Sheets

Related U.S. Application Data 2013, now Pat. No. 11,666,937, which is a continuation of application No. 13/725,000, filed on Dec. 21, 2012, now Pat. No. 9,375,750.

(51) Int. Cl.

| | | |
|---|---|---|
| *B05D 3/00* | (2006.01) | |
| *B05D 3/06* | (2006.01) | |
| *C09D 7/61* | (2018.01) | |
| *E04C 2/02* | (2006.01) | |
| *E04C 2/12* | (2006.01) | |
| *E04C 2/26* | (2006.01) | |
| *B05D 5/00* | (2006.01) | |
| *B05D 7/00* | (2006.01) | |

(52) U.S. Cl.
CPC .............. *C09D 7/61* (2018.01); *E04C 2/02* (2013.01); *E04C 2/12* (2013.01); *E04C 2/26* (2013.01); *B05D 5/00* (2013.01); *B05D 7/52* (2013.01); *B05D 2451/00* (2013.01); *B05D 2601/24* (2013.01); *Y10T 428/31515* (2015.04); *Y10T 428/31591* (2015.04); *Y10T 428/31598* (2015.04); *Y10T 428/31663* (2015.04); *Y10T 428/31667* (2015.04)

(58) Field of Classification Search
CPC .. B05D 7/52; B05D 2451/00; B05D 2601/24; E04C 2/02; E04C 2/12; E04C 2/26; Y10T 428/31515; Y10T 428/31591; Y10T 428/31598; Y10T 428/31663; Y10T 428/31667
See application file for complete search history.

(56) References Cited

U.S. PATENT DOCUMENTS

| | | | |
|---|---|---|---|
| 5,439,514 A | 8/1995 | Kashiwazaki et al. | |
| 5,500,331 A | 3/1996 | Czekai et al. | |
| 5,679,138 A | 10/1997 | Bishop et al. | |
| 5,714,269 A | 2/1998 | Munoz Madrid | |
| 5,853,830 A | 12/1998 | McCaulley et al. | |
| 5,882,246 A | 3/1999 | Inkyo et al. | |
| 5,962,343 A | 10/1999 | Kasai et al. | |
| 6,162,842 A | 12/2000 | Freche et al. | |
| 6,165,619 A * | 12/2000 | Ikenaga | B05D 7/546 427/407.1 |
| 6,228,480 B1 | 5/2001 | Kimura et al. | |
| 6,284,314 B1 | 9/2001 | Kato et al. | |
| 6,299,981 B1 | 10/2001 | Azzopardi et al. | |
| 6,409,821 B1 | 6/2002 | Cassar et al. | |
| 6,436,159 B1 | 8/2002 | Safta et al. | |
| 6,666,913 B2 | 12/2003 | Hirano et al. | |
| 6,740,312 B2 | 5/2004 | Chopin et al. | |
| 6,835,421 B1 | 12/2004 | Dieter | |
| 6,905,814 B1 | 6/2005 | Aubay et al. | |
| 8,568,870 B2 | 10/2013 | Imai et al. | |
| 8,652,646 B2 | 2/2014 | Heukelbach et al. | |
| 9,375,750 B2 | 6/2016 | Reenberg et al. | |
| 9,573,126 B2 | 2/2017 | Humle et al. | |
| 9,945,075 B2 | 4/2018 | Persson et al. | |
| 9,963,609 B2 | 5/2018 | Brummerstedt et al. | |
| 2002/0005145 A1 | 1/2002 | Sherman | |
| 2002/0006425 A1 | 1/2002 | Takaoka et al. | |
| 2002/0042343 A1 | 4/2002 | Akui et al. | |
| 2002/0108640 A1 | 8/2002 | Barger et al. | |
| 2003/0162658 A1 | 8/2003 | Domen et al. | |
| 2003/0207083 A1 | 11/2003 | Hansson et al. | |
| 2003/0236317 A1 | 12/2003 | Sakatani et al. | |
| 2004/0067703 A1 | 4/2004 | Grunden et al. | |
| 2004/0081818 A1 | 4/2004 | Baumann et al. | |
| 2004/0197682 A1 | 10/2004 | Sonehara et al. | |
| 2004/0251329 A1 | 12/2004 | Hsu et al. | |
| 2004/0253172 A1 | 12/2004 | Jung et al. | |
| 2005/0069706 A1 | 3/2005 | Kessell | |
| 2005/0145939 A1 | 7/2005 | Okada et al. | |
| 2005/0191505 A1 | 9/2005 | Akarsu et al. | |
| 2005/0227008 A1 | 10/2005 | Okada et al. | |
| 2005/0228112 A1 | 10/2005 | Takahashi et al. | |
| 2005/0230241 A1 | 10/2005 | Aso et al. | |
| 2005/0233893 A1 | 10/2005 | Sakatani et al. | |
| 2006/0003013 A1 | 1/2006 | Dobbs | |
| 2006/0014050 A1 | 1/2006 | Gueneau et al. | |
| 2006/0194886 A1 | 8/2006 | Adam et al. | |
| 2007/0140951 A1 | 6/2007 | O'Brien et al. | |
| 2007/0154378 A1 | 7/2007 | Aso et al. | |
| 2007/0190324 A1 | 8/2007 | Hayashi et al. | |
| 2007/0272382 A1 | 11/2007 | Becker et al. | |
| 2007/0295244 A1 | 12/2007 | Himmelreich et al. | |
| 2008/0032120 A1 | 2/2008 | Braun | |
| 2008/0044483 A1 | 2/2008 | Kessell | |
| 2008/0260626 A1 | 10/2008 | Bloss et al. | |
| 2009/0025508 A1 | 1/2009 | Liao et al. | |
| 2009/0075093 A1 | 3/2009 | Iversen et al. | |
| 2009/0098305 A1 | 4/2009 | Cheng et al. | |
| 2009/0136861 A1 | 5/2009 | Mitsumori et al. | |
| 2009/0142604 A1 | 6/2009 | Imai et al. | |
| 2009/0180976 A1 | 7/2009 | Seeney et al. | |
| 2009/0191273 A1 | 7/2009 | Kessell et al. | |
| 2009/0208646 A1 | 8/2009 | Kreuder et al. | |
| 2009/0286068 A1 | 11/2009 | Niguma et al. | |
| 2009/0317624 A1 | 12/2009 | Yoshioka et al. | |
| 2010/0031450 A1 | 2/2010 | Wattebled et al. | |
| 2010/0058954 A1 | 3/2010 | Kisch | |
| 2010/0112359 A1 | 5/2010 | Sharma et al. | |
| 2010/0113254 A1 | 5/2010 | Sato et al. | |
| 2010/0203308 A1 | 8/2010 | Mennig et al. | |
| 2010/0297434 A1 | 11/2010 | Iversen et al. | |
| 2011/0027485 A1 | 2/2011 | Kahn et al. | |
| 2011/0083726 A1 | 4/2011 | Takayanagi et al. | |
| 2011/0095242 A1 | 4/2011 | Jin et al. | |
| 2011/0123814 A1 | 5/2011 | Heukelbach et al. | |
| 2011/0136660 A1 | 6/2011 | Terasaki et al. | |
| 2011/0136928 A1 | 6/2011 | Dipietro et al. | |
| 2011/0189471 A1 | 8/2011 | Ziegler et al. | |
| 2011/0300372 A1 | 12/2011 | Didavide et al. | |
| 2012/0064787 A1 | 3/2012 | Brummerstedt et al. | |
| 2013/0008585 A1 | 1/2013 | Hasskerl et al. | |
| 2013/0011684 A1 * | 1/2013 | Jensen | B01J 37/0244 428/452 |
| 2013/0177504 A1 | 7/2013 | Macoviak | |
| 2013/0216458 A1 | 8/2013 | Nagae et al. | |
| 2014/0178694 A1 | 6/2014 | Reenberg et al. | |
| 2015/0083319 A1 | 3/2015 | Persson et al. | |
| 2015/0102258 A1 | 4/2015 | Humle et al. | |
| 2015/0343486 A1 | 12/2015 | Jensen et al. | |
| 2016/0075606 A1 | 3/2016 | Jensen et al. | |
| 2017/0297056 A1 | 10/2017 | Ziegler et al. | |

FOREIGN PATENT DOCUMENTS

| | | |
|---|---|---|
| CN | 1445312 A | 10/2003 |
| CN | 1662465 A | 8/2005 |
| CN | 1762580 A | 4/2006 |
| DE | 102004032058 A1 | 5/2005 |
| DE | 102007054848 A1 | 5/2009 |
| EP | 0684507 A2 | 11/1995 |
| EP | 0913447 A1 | 5/1999 |
| EP | 0947469 A2 | 10/1999 |
| EP | 1371693 A2 | 12/2003 |
| EP | 1541231 A1 | 6/2005 |
| EP | 1541638 A1 | 6/2005 |
| EP | 1577009 A1 | 9/2005 |
| EP | 1760116 A1 | 3/2007 |
| EP | 1997623 A1 | 12/2008 |
| EP | 1997860 A1 | 12/2008 |
| EP | 2281684 A1 | 2/2011 |
| FR | 2789591 A1 | 8/2000 |
| JP | 50-105729 A | 8/1975 |
| JP | 10-235201 A | 9/1998 |
| JP | 2001038858 A * | 2/2001 |
| JP | 2001-089708 A | 4/2001 |
| JP | 2001-131768 A | 5/2001 |

(56) References Cited

FOREIGN PATENT DOCUMENTS

| | | |
|---|---|---|
| JP | 2002-011827 A | 1/2002 |
| JP | 2002-146283 A | 5/2002 |
| JP | 2002-177792 A | 6/2002 |
| JP | 2002-249705 A | 9/2002 |
| JP | 2002-316390 A | 10/2002 |
| JP | 2003-071967 A | 3/2003 |
| JP | 2003-211576 A | 7/2003 |
| JP | 2005-281017 A | 10/2005 |
| JP | 2006-142217 A | 6/2006 |
| JP | 2006-219855 A | 8/2006 |
| JP | 2007-167718 A | 7/2007 |
| JP | 2007-176753 A | 7/2007 |
| JP | 2007-229666 A | 9/2007 |
| JP | 2008-023840 A | 2/2008 |
| JP | 2008-261093 A | 10/2008 |
| JP | 2010-047016 A | 3/2010 |
| JP | 2011-500896 A | 1/2011 |
| WO | 96/39251 A1 | 12/1996 |
| WO | 97/00134 A1 | 1/1997 |
| WO | 97/30130 A1 | 8/1997 |
| WO | 98/03607 A1 | 1/1998 |
| WO | 98/23549 A1 | 6/1998 |
| WO | 98/25711 A1 | 6/1998 |
| WO | 00/44984 A1 | 8/2000 |
| WO | 02/08518 A1 | 1/2002 |
| WO | 02/64266 A2 | 8/2002 |
| WO | 03/16219 A1 | 2/2003 |
| WO | 03/87002 A1 | 10/2003 |
| WO | 2004/005577 A2 | 1/2004 |
| WO | 2004/069400 A1 | 8/2004 |
| WO | 2005/045131 A1 | 5/2005 |
| WO | 2005/066286 A1 | 7/2005 |
| WO | 2005/068181 A1 | 7/2005 |
| WO | 2005/116361 A1 | 12/2005 |
| WO | 2006/136931 A1 | 12/2006 |
| WO | 2007/015669 A2 | 2/2007 |
| WO | 2007/069596 A1 | 6/2007 |
| WO | 2007/072008 A2 | 6/2007 |
| WO | 2007/097284 A1 | 8/2007 |
| WO | 2007/135987 A1 | 11/2007 |
| WO | 2007/144718 A2 | 12/2007 |
| WO | 2008/040730 A1 | 4/2008 |
| WO | 2008/117655 A1 | 10/2008 |
| WO | 2008/128818 A1 | 10/2008 |
| WO | 2008/133370 A1 | 11/2008 |
| WO | 2009/021524 A1 | 2/2009 |
| WO | 2009/024285 A1 | 2/2009 |
| WO | 2009/049000 A1 | 4/2009 |
| WO | 2009/062516 A2 | 5/2009 |
| WO | 2009/065769 A2 | 5/2009 |
| WO | 2009/124704 A1 | 10/2009 |
| WO | 2009/145209 A1 | 12/2009 |
| WO | 2009/157449 A1 | 12/2009 |
| WO | 2010/001669 A1 | 1/2010 |
| WO | 2010/037866 A1 | 4/2010 |
| WO | 2010/110726 A1 | 9/2010 |
| WO | 2011/075837 A1 | 6/2011 |
| WO | 2011/093785 A1 | 8/2011 |
| WO | 2011/113692 A1 | 9/2011 |
| WO | 2012/014893 A1 | 2/2012 |
| WO | 2013/006125 A1 | 1/2013 |
| WO | 2013/141789 A1 | 9/2013 |

OTHER PUBLICATIONS

"Information Sheet—Cleaning and maintenance of laminate flooring in commercial areas created on behalf of the EPLF," Sep. 22, 1999, 5 pages, European Producers of Laminate Flooring, Bielefeld, DE.

"Transparent Pigments," Kirk-Othmer Encyclopedia of Chemical Technology, Fourth Edition, 1996, vol. 19, pp. 36-37, John Wiley & Sons, Inc., NY, US.

Arin, Melis, et al., "Inkjet printing of photocatalytically active TiO2 thin films from water based precursor solutions," 28 pages; also found in Journal of the European Ceramic Society, Jun. 2011, pp. 1067-1074, vol. 31, Issue 6, Science Direct, Elsevier B.V. (Rev. Dec. 10, 2010, Acc Dec. 21, 2010).

Caseri, Walter, "Nanocomposites of polymers and metals or semiconductors: Historical background and optical properties," Macromol. Rapid Commun., Jan. 1, 2000, pp. 705-722, vol. 21, No. 11, Wiley-VCH Verlag GmbH, Weinheim, DE.

Decision to Grant a Patent received for Japanese Patent Application No. 2015-549321, mailed on Jan. 25, 2019, 5 pages (2 pages of English Translation and 3 pages of Original Document).

Decision to grant received for European Application No. 13864748, mailed on Jul. 4, 2019, 2 pages.

English translation of EP 1997623.

Extended European Search Report and Search Opinion received for European Application No. 13864748.2, mailed on Jul. 21, 2016, 6 pages.

Fumed Silica definition, Hawley's Condensed Chemical Dictionary, 1121, (2007), Wiley Online Library, 2 pages.

Ingkyo, Mitsugi, et al., "Beads Mill-Assisted Synthesis of Poly Methyl Methacrylate (PMMA)-TiO2 Nanoparticle Composites," Ind. Eng. Chem. Res., 2008, pp. 2597-2604, vol. 47, No. 8, American Chemical Society, USA (published on the web Mar. 14, 2008).

Ingkyo, Mitsugi, et al., "Experimental investigation of nanoparticle dispersion by beads milling with centrifugal bead separation," Journal of Colloid and Interface Science, 2006, pp. 535-540, vol. 304, Elsevier Inc., USA.

Intention to grant received for European Application No. 13864748.2, mailed on Mar. 1, 2019, 7 pages.

International Preliminary Report on Patentability received for PCT Patent Application No. PCT/SE2013/051604, mailed on Jul. 2, 2015, 7 pages.

International Search Report and Written Opinion received for PCT Patent Application No. PCT/SE2013/051604, mailed on Mar. 20, 2014, 10 pages.

Jang, Hee Dong, et al., "Effect of particle size and phase composition of titanium dioxide nanoparticles on the photocatalytic properties," Journal of Nanoparticle Research, Jan. 1, 2001, pp. 141-147, vol. 3, Kluwer Academic Publishers, NL.

Jensen, Henrik, et al, "Characterization of nanosized partly crystalline photocatalysts", Journal of Nanoparticle Research 6, 2004, pp. 519-526.

Joni, I Made, et al., "Dispersion Stability Enhancement of Titania Nanoparticles in Organic Solvent Using a Bead Mill Process," Ind. Eng. Chem. Res., 2009, pp. 6916-6922, vol. 48, No. 15, American Chemical Society, USA (published on the web Jul. 13, 2009).

Kim, Seong-Jim, et al., "Aqueous TiO2 suspension preparation and novel application of ink-jet printing technique for ceramics patterning," Journal of Materials Science Letters, 1998, pp. 141-144, vol. 17, Chapman & Hall, London, England.

Kuscer, Danjela, et al., "Formulation of an Aqueous Titania Suspension and its Patterning with Ink-Jet Printing Technology," J Am Ceram Soc., 2012, pp. 487-493, vol. 95, No. 2, Blackwell Publishing Inc on behalf of the American Ceramic Society, USA.

Mandzy, N., et al., "Breakage of TiO2 agglomerates in electrostatically stabilized aqueous dispersions," Powder Technology, Dec. 6, 2005, pp. 121-126, vol. 160, No. 2, Elsevier Sequoia, Lausanne, CH.

Mills, A., et al., "An intelligence ink for photocatalytic films," Chem. Commun., published as an Advance Article on the web Apr. 14, 2005, pp. 2721-2723, The Royal Society of Chemistry, www.rsc.org.chemcomm.

Notice of Final Rejection received for Korean Patent Application No. 10-2015-7017913, mailed on Feb. 1, 2021, 10 pages (6 pages of English Translation and 4 pages of Original Document).

Notice of Final Rejection received for Korean Patent Application No. 10-2015-7017913, mailed on Dec. 3, 2020, 9 pages (5 pages of English Translation and 4 pages of Original Document).

Notice of Reasons for Refusal received for Japanese Patent Application No. 2015-549321, mailed on May 11, 2018, 12 pages (6 pages of English Translation and 6 pages of Original Document).

Nussbaumer, René J., et al., "Synthesis and characterization of surface-modified rutile nanoparticles and transparent polymer com-

(56) References Cited

OTHER PUBLICATIONS posites thereof," Journal of Nanoparticle Research, Aug. 1, 2002, pp. 319-323, vol. 4, No. 4, Kluwer Academic Publishers, NL.

Office Action received for European Application No. 13864748.2, mailed on Apr. 4, 2018, 4 pages.

Official Action issued in Chinese Patent Application No. 201380065759.1, dated Jan. 31, 2018, The State Intellectual Property Office of People's Republic of China, CN, 31 pages.

Official Action issued in Japanese Patent Application No. 2015-549321, dated Jul. 28, 2017, Japanese Intellectual Property Office, JP, 13 pages (including English-language translation).

Parker, John, "Next-generation abrasive particles for CMP", Solid Technology, Dec. 2004, pp. 30-31.

Raimondo, Mariarosa, et al., Photocatalytic Ceramic Tiles: Key Factors in Industrial Scale-Up (and the Open Question of Performance), Qualicer 2012, pp. 1-14, Castellón, Spain.

Request for the Submission of an Opinion received for Korean Patent Application No. 10-2015-7017913, mailed on Jun. 3, 2020, 14 pages (8 pages of English Translation and 6 pages of Original Document).

Request for the Submission of an Opinion received for Korean Patent Application No. 10-2021-7005239, mailed on Jun. 1, 2021, 15 pages (9 pages of English Translation and 6 pages of Original Document).

Schmidt, Helmut K., et al., "Application of spray techniques for new photocatalytic gradient coatings on plastics," Thin solid films, Apr. 28, 2006, vol. 502, Issues 1-2, pp. 132-137, Elsevier B.V., NL.

Showa Denko "SDK Develops TiO2 Photocatalyst Responsive to Visible Light" Dec. 3, 2002.

Takeda, Masayoshi, et al., "High-concentration Transparent TiO2 Nanocomposite Films Prepared from TiO2 Nanoslurry Dispersed by Using Bead Mill," Polymer Journal, 2008, pp. 694-699, vol. 40, No. 8, The Society of Polymer Science, JP.

Takeda, Masayoshi, et al., "Preparation of Nanocomposite Microspheres Containing High Concentration of TiO.SUB.2 .Nanoparticles via Bead Mill Dispersion in Organic Solvent," Chemistry Letters, 2009, pp. 448-449, vol. 38, No. 5, The Chemical Society of Japan, JP.

Thilagan Palaniandy, Samayamutthirian, "A Study on Ultra Fine Grinding of Silica and Talc in Opposed Fluidized Bed Jet Mill," PhD Thesis, 2008, 48 pages, Universiti Sains Malaysia, http://eprints.usm.my/view/creators/Thilagan—Palaniandy=3ASamayamutthirian=3A=3A.html.

Thompson, Tracy L., et al., "Surface Science Studies of the Photoactivation of TiO.SUB.2.—New Photochemical Processes," Chem. Rev., 2006, pp. 4428-4453, vol. 106, No. 10, American Chemical Society, USA (published on the web Oct. 11, 2006).

Uzunova-Bujnova, M., et al., "Effect of the mechanoactivation on the structure, sorption and photocatalytic properties of titanium dioxide," Materials Chemistry and Physics, 2008, pp. 291-298, vol. 110, Elsevier B.V., The Netherlands.

Written Decision on Registration received for Korean Patent Application No. 10-2021-7005239, mailed on Nov. 15, 2021, 4 pages (2 pages of English Translation and 2 pages of Original Document).

Wu, Shu-Xin, et al., "XPS Study of Copper Doping TiO2 Photocatalyst," Acta. Phys.-Chim. Sin., Oct. 2003, pp. 967-969, vol. 19(10), CN.

\* cited by examiner

METHOD FOR COATING A BUILDING PANEL AND A BUILDING PANEL

CROSS REFERENCE TO RELATED APPLICATIONS

The present application is a divisional of U.S. application Ser. No. 14/654,203, filed on Jun. 19, 2015, which is a U.S. national stage of International Application No. PCT/SE2013/051604, filed on Dec. 20, 2013, which claims the benefit of U.S. application Ser. No. 13/725,000, filed on Dec. 21, 2012, now U.S. Pat. No. 9,375,750, and the benefit of Swedish Application No. 1251483-2, filed on Dec. 21, 2012. The entire contents of each of U.S. application Ser. No. 14/654,203, International Application No. PCT/SE2013/051604, U.S. application Ser. No. 13/725,000, and Swedish Application No. 1251483-2 are hereby incorporated herein by reference in their entirety.

TECHNICAL FIELD

The disclosure generally relates to the field of building panels, such as floor panels, wall panels and furniture components, and a method of coating building panels with a photocatalytic coating.

BACKGROUND

For floor panels and wall panels, the visual appearance is important. Furthermore, due to new regulations it is important to introduce properties that can reduce the level of indoor volatile organic compounds (VOC's).

It is well known that building materials can obtain photocatalytic properties. U.S. Pat. No. 6,409,821 describes how to apply $TiO_2$ to external cement building materials by mixing micron sized $TiO_2$ in the bulk cement mixture.

Furthermore, it was shown in WO 2009/062516 that it is possible to apply nanoparticles on a laminate surface or on an overlay paper and introduce photocatalytic properties to interior surfaces such as floor panels.

US 2010/0058954 describes a carbon-modified titanium dioxide film arranged on a substrate such as glass, metal, plastic, or titanium dioxide film. A barrier layer may be arranged to prevent potential diffusion of sodium and other ions from the substrate into the carbon-modified titanium dioxide film. The photocatalytic activity can be inhibited by diffusion of sodium and other ions from the substrate.

WO 2013/006125 describes a photocatalytic layer and a barrier layer.

It has also been discovered that the photocatalytic activity of the nanoparticles degrades not only volatile organic compounds but also underlying surfaces to which the nanoparticles are applied.

Objects

An objective of at least certain embodiments of the present invention is to provide a building panel having improved washing properties thereby providing an overall cleaner looking floor.

An objective of at least certain embodiments of the present invention is to provide a building panel having improved VOC removing properties thereby providing an overall improved indoor environment.

Still another objective of at least certain embodiments is to provide a photocatalytic building panel having an improved antimicrobial effect and/or an improved deodorizing effect and/or an improved degradation of VOC effect and/or anti stain properties of said building panel.

A still further objective of at least certain embodiments is to provide an active photocatalytic composition on building panels with minimal impact on the underlying coating layer.

A still further objective of at least certain embodiments is to provide an active photocatalytic composition on building panels with minimal impact on the underlying coating layer but still being active enough to provide improved VOC properties and/or washing properties at indoor light conditions.

A still further objective of at least certain embodiments is to provide coating compositions to building panels without impacting the visual appearance of the building panels.

Furthermore, it can be an objective of at least certain embodiments of the present invention to provide a method for producing such photocatalytic building panels.

SUMMARY

According to a first aspect of the invention, a method for coating a building panel is provided. The method comprises applying a first coating fluid comprising an organic binder on a surface of the building panel to obtain at least one coating layer, and applying barrier components and photocatalytic particles, preferably TiO2, on said at least one coating layer.

The photocatalytic particles are preferably photocatalytic nanoparticles, preferably nano-sized $TiO_2$.

The barrier components are adapted to prevent the photocatalytic particles from degrading the organic binder.

The surface comprises preferably a decorative surface of the building panel.

An advantage of the present invention is that a building panel having VOC reducing properties is obtained by the method. The building panel thus reduces the level of indoor volatile organic compounds (VOC's) by its photocatalytic activity. The photocatalytic activity of the photocatalytic particles also provides improved antimicrobial effect and improved deodorizing effect, thereby contributing to an improved indoor environment.

A further advantage is that a building panel having improved washing properties is obtained. The surface of the building panel obtains hydrophilic properties due to the applied photocatalytic particles. The hydrophilic surface of the building panel facilitates cleaning by the fact that water applied forms a film instead of contracting droplets, and thus dries faster and more uniformly. As a consequence, water stains from dirt or dissolved salts are reduced due to water being more uniformly distributed on the surface. The hydrophilic surface of the building panel has preferably a contact angle with water being less than 50°, preferably less than 40°.

A further advantage is that the photocatalytic activity of the building panel is maintained as long as the surface of the building panel is maintained.

A further advantage is that the photocatalytic activity does not impact the underlying coating layer applied to the surface of the building panel. If photocatalytic particles are applied to a coating layer comprising an organic binder, such as a coating layer comprising an acrylate or methacrylate oligomer or monomer, an undesired effect of the photocatalytic activity is that the photocatalytic particles react with the underlying coating layer, and the underlying coating layer can thereby be damaged by the photocatalytic activity of the particles. For example, the photocatalytic activity of the photocatalytic particles may degrade the underlying coating layer. The photocatalytic particles degrade the organic binder of the coating layer. The photocatalytic particles degrade bindings of the organic binder, such as bindings obtained by the acrylate or methacrylate monomer or oligomer. The photocatalytic activity can lead to that the coating layer is degraded into dust, thus affecting both functionality of the coating layer and the visual impression of the building panel. The photocatalytic particles may also impact other properties of the underlying coating layer, such as changing the colour of the coating layer.

By applying barrier components between the photocatalytic particles and the coating layer, the barrier components protect the coating layer from the photocatalytic activity of the photocatalytic particles. The barrier components preferably form at least one monolayer. The barrier components prevent the photocatalytic particles from make contact and react with the underlying coating layer. The barrier components prevent the photocatalytic particles from degrading the organic binder, such as an acrylate or methacrylate monomer or oligomers, of the coating layer. The barrier components prevent the photocatalytic particles from degrade bindings made by the organic binder, such as bindings of the acrylate or methacrylate monomer or oligomer. Thereby, both functionality and mechanical properties of the coating layer and the visual impression of the coating layer are maintained over time.

By applying barrier components, photocatalytic particles can be applied to any surface provided with a coating layer comprising an organic binder. Thus, photocatalytic properties can be provided on any surface provided with an organic coating layer.

The photocatalytic particles are preferably photocatalytic nanoparticles. The photocatalytic nanoparticles may have a size of less than 100 nm, preferably less than 50 nm, more preferably less than 30 nm, most preferably less than 20 nm, as measured when being present in the photocatalytic coating fluid. The photocatalytic particles comprise preferably $TiO_2$, preferably in anatase form. The photocatalytic particles are preferably visible light sensitive and/or UV light sensitive.

The barrier layer is preferably transparent. The photocatalytic layer is preferably transparent. Thereby, the visual impression of the building panel is not affected.

More than one coating layer may be applied to the surface of the building panel. The coating layers may have different properties and/or different appearance. One of the coating layers may be a base coating layer. Another of the coating layers may be a top coating layer applied on the base coating layer. The coating layer may be a lacquer layer or varnish layer.

The barrier components may be at least partly embedded in one of the coating layers, for example at least partly embedded in a top coating layer.

The step of applying the barrier components and the photocatalytic particles may comprise applying a barrier coating fluid comprising the barrier components on said at least one coating layer to obtain a barrier layer, and applying a photocatalytic coating fluid comprising the photocatalytic particles on said barrier layer to obtain a photocatalytic layer. The barrier layer and the photocatalytic layer form an overlying layer. The barrier layer is preferably at least one monolayer of the barrier components.

The organic binder may comprise an acrylate or methacrylate monomer, or an acrylate or methacrylate oligomer.

The acrylate or methacrylate monomer or acrylate or methacrylate oligomer may be an epoxy acrylate, an epoxy methacrylate, a urethane acrylate, a urethane methacrylate, a polyester acrylate, a polyester methacrylate, a polyether acrylate, a polyether methacrylate, an acrylic acrylate, an acrylic methacrylate, a silicone acrylate, a silicone methacrylate, a melamine acrylate, a melamine methacrylate, or a combination thereof. The above examples are examples of monomer or oligomers polymerised by radical reaction. The above monomers or oligomers may form a component of the coating fluid. The oligomers contribute to the final properties of the coating layer.

The first coating fluid may be a radiation curing coating fluid, preferably UV curing coating fluid. Electron beam curing is also contemplated.

The method may further comprise partly curing said at least one coating layer, preferably by radiation curing, more preferably by UV curing, prior to applying the barrier components and the photocatalytic particles. Preferably, the barrier coating fluid is applied to the coating layer before gelation of the coating layer, or at least before complete gelation of the coating layer. Thereby, influence on the visual impression of the coating layer by the barrier components is reduced. Furthermore, by applying the barrier components to the coating layer before gelation of the coating layer, the barrier components may be at least partly embedded in the underlying coating layer. By applying the barrier components in an at least partly wet surface the distribution of the particles may be improved.

The surface of the building panel may comprise wood, wood veneer, wood-based board, cork, linoleum, thermoplastic material, thermosetting material, or paper. The building panel may be a wood panel, a wood-based panel, a panel having a surface of wood veneer, a linoleum building panel, a cork building panel, a thermoplastic floor panel such as a Luxury Vinyl Tile or Plank. The building panel may for example be a floor panel, a wall panel, a ceiling panel, a furniture component, etc.

The method may further comprise drying said barrier layer, prior to applying the photocatalytic coating fluid. The drying may be performed by means of IR.

The method may further comprise drying the photocatalytic layer. The drying may be performed by means of IR.

The method may further comprise curing said at least one coating layer, said overlying layer, said barrier layer and/or said photocatalytic layer. Preferably, said at least one coating layer is completely cured together with the barrier layer and the photocatalytic layer in a final step.

The concentration of the photocatalytic particles in the photocatalytic fluid may be up to about 30 wt %, preferably up to about 20 wt %, more preferably up to about 10 wt %, most preferably up to about 5 wt %.

The concentration of the barrier components in the barrier coating fluid may be up to about 40 wt %, such as about 30 wt %, preferably up to about 20 wt %, such as about 10 wt %, for example up to about 5 wt %.

The thickness of the barrier layer may be up to about 1 μm, preferably up to about 0.600 μm, more preferably up to about 0.400 μm, most preferably up to about 0.100 μm.

The thickness of the photocatalytic layer may be up to about 1 μm, preferably up to about 0.600 μm, more preferably up to about 0.400 μm, most preferably up to about 0.100 μm.

The amount of the barrier and/or photocatalytic coating fluid(s) applied may be up to about 50 ml/m2, preferably up to about 40 ml/m2, more preferably up to about 30 ml/m2, and most preferably up to about 20 ml/m2. In one embodiment, the amount of the barrier and/or photocatalytic coating fluid(s) applied may be up to about 15 ml/m2, preferably up to about 10 ml/m2, more preferably up to about 5 ml/m2, and most preferably up to about 1 ml/m2.

The concentration of the barrier components in the barrier layer may be at least 70%, more preferably at least 80% and most preferably at least 90%. In one embodiment, the barrier layer substantially consists of the barrier components. By substantially consist is meant that additives and a binder may be present in small amount compared to the amount of the barrier components.

The barrier and/or photocatalytic coating fluid(s) may be aqueous/waterborne fluids. The barrier and/or the photocatalytic coating fluid(s) may also be a hybrid system, comprising both physically dryable and curable parts. It is also contemplated that a solvent other than water is used.

The barrier and/or photocatalytic coating fluid(s) may be applied by spraying.

The size of the droplet of said barrier and/or photocatalytic coating fluids may be up to about 200 µm, preferably up to about 100 µm, more preferably up to about 50 µm, and most preferably up to about 10 µm. If the size of the droplets exceeds about 200 µm, individual droplets may be visible on the surface, resulting in an aesthetically less pleasant coating. By diminishing the size of the droplets, a coating having an even surface is obtained, with no, or at least reduced, visible droplets.

The barrier components may comprise a silicium containing compound such as $SiO_2$, colloidal $SiO_2$, functional nanoscaled $SiO_2$, silicone resin, organofunctional silanes, and/or colloidal silicic acid silane and/or a combination of said compounds. Silicium containing compounds prevent bonding caused by the organic binder of the coating layer, for example bonding between the acrylate or methacrylate monomers or oligomers, to be degraded by the photocatalytic activity. The barrier components may be particles, fibres, oligomers, polymers, etc. The barrier components may have a size in the nano range, for example less than 400 nm such as 300-400 nm. In one embodiment, the barrier components may be less than 100 nm.

The photocatalytic coating fluid may comprise photocatalytic particles and a solvent, said solvent being selected from water, ethylene glycol, butyl ether, aliphatic linear, branched or cyclic or mixed aromatic-aliphatic alcohols, such as methanol, ethanol, propanol, isopropanol, butanol, isobutanol, benzyl alcohol or methoxypropanol or combinations thereof. The barrier coating fluid may comprise barrier components and a solvent, said solvent being selected from water, ethylene glycol, butyl ether, aliphatic linear, branched or cyclic or mixed aromatic-aliphatic alcohols, such as methanol, ethanol, propanol, isopropanol, butanol, isobutanol, benzyl alcohol or methoxypropanol or combinations thereof.

According to a second aspect of the invention, a building panel is provided. The building panel comprising a surface provided with at least one radiation cured coating layer comprising an organic binder, wherein said at least one coating layer is arranged on said surface, and at least one overlying layer comprising barrier components and photocatalytic particles, preferably $TiO_2$, wherein the barrier components prevent the photocatalytic particles from degrading the organic binder of said at least one coating layer, and wherein said at least one overlying layer is arranged on said at least one coating layer.

The surface comprises preferably a decorative surface of the building panel.

An advantage of the second aspect of invention is that the building panel has VOC reducing properties. The building panel thus reduces the level of indoor volatile organic compounds (VOC's) by its photocatalytic activity. The photocatalytic activity of the photocatalytic particles also provides improved antimicrobial effect and improved deodorizing effect, thereby contributing to an improved indoor environment.

A further advantage is that the inventive building panel has improved washing properties. The surface of the building panel obtains hydrophilic properties due to the applied photocatalytic particles. The hydrophilic surface of the building panel facilitates cleaning by the fact that water applied forms a film instead of contracting droplets, and thus dries faster and more uniformly. As a consequence, water stains from dirt or dissolved salts are reduced due to water being more uniformly distributed on the surface. The hydrophilic surface of the building panel has preferably a contact angle with water being less than 50°, preferably less than 40°.

A further advantage is that the photocatalytic activity of the building panel is maintained as long as the surface of the building panel is maintained.

A further advantage is that the photocatalytic activity does not impact the underlying coating layer applied to the surface of the building panel. If photocatalytic particles are applied to a coating layer comprising an organic binder, such as a coating layer comprising an acrylate or methacrylate monomer or oligomer, an undesired effect of the photocatalytic activity is that the photocatalytic particles react with an underlying coating layer, and the underlying coating layer can thereby be damaged by the photocatalytic activity of the particles. For example, the photocatalytic activity of the photocatalytic particles may degrade the underlying coating layer. The photocatalytic particles degrade the organic binder of the coating layer. The photocatalytic particles degrade bindings of the organic binder, such as bindings of the acrylate or methacrylate monomer or oligomer. The photocatalytic activity can lead to that the coating layer is degraded into dust, thus affecting both functionality of the coat layer and the visual impression of the building panel. The photocatalytic particles may also impact other properties of the underlying coating layer, such as changing the colour of the coating layer.

By applying barrier components between the photocatalytic particles and the underlying coating layer, the barrier components protect the underlying coating layer from the photocatalytic activity of the photocatalytic particles. The barrier components prevent the photocatalytic particles from make contact and react with the underlying coating layer. The barrier components prevent the photocatalytic particles from degrading the organic binder, such as acrylate or methacrylate monomers or oligomers, of the underlying coating layer. The barrier components prevent the photocatalytic particles from degrade bindings of the organic binder comprising for example acrylate or methacrylate monomer or oligomer. Thereby, both functionality and mechanical properties of the coating layer and the visual impression of the coating layer are maintained over time.

By applying barrier components, photocatalytic particles can be applied to any surface provided with an organic coating layer. Thus, photocatalytic properties can be provided on any surface provided with an organic coating layer.

The photocatalytic particles are preferably photocatalytic nanoparticles. The photocatalytic nanoparticles may have a size of less than 100 nm, preferably less than 50 nm, more preferably less than 30 nm, and most preferably less than 20 nm, as measured when being present in the photocatalytic coating fluid. The photocatalytic particles comprise preferably $TiO_2$, preferably in anatase form. The photocatalytic particles are preferably visible light sensitive and/or UV sensitive photocatalytic particles.

The organic binder may comprise an acrylate or methacrylate monomer, or an acrylate or methacrylate oligomer.

The acrylate or methacrylate monomer or acrylate or methacrylate oligomer may be an epoxy acrylate, an epoxy methacrylate, a urethane acrylate, a urethane methacrylate, a polyester acrylate, a polyester methacrylate, a polyether acrylate, a polyether methacrylate, an acrylic acrylate, an acrylic methacrylate, a silicone acrylate, a silicone methacrylate, a melamine acrylate, a melamine methacrylate, or a combination thereof.

The above examples are examples of monomer or oligomers polymerised by radical reaction.

Said at least one coating layer may comprise a radiation curable coating, preferably a UV curable coating.

The surface of the building panel may comprise wood, wood veneer, wood-based board, cork, linoleum, thermoplastic material, thermosetting material, or paper. The building panel may be a wood panel, a wood-based panel, a panel having a surface layer of wood veneer, a linoleum building panel, a cork building panel, a thermoplastic floor panel such as a Luxury Vinyl Tile or Plank. The building panel may for example be a floor panel. The surface layer may be arranged on a core.

The overlying layer may be transparent. Thereby, the visual impression of the building panel is not affected by the overlying layer.

More than one coating layer may be arranged on the surface of the building panel. The coating layers may have different properties and/or different appearance. One of the coating layers may be a base coating layer. Another of the coating layers may be a top coating layer applied on the base coating layer. The coating layer may be a lacquer layer or varnish layer.

The barrier components may be at least partly embedded in one of the coating layers, for example embedded in a top coating layer.

The photocatalytic particles may be embedded in the overlying layer. The barrier components may be embedded in the overlying layer.

Said at least one overlying layer may comprise a barrier layer comprising the barrier components and a photocatalytic layer comprising the photocatalytic particles, wherein the barrier layer is arranged between said at least one coating layer and the photocatalytic layer. Preferably, the barrier components are embedded and substantially homogenously distributed in said barrier layer. Preferably, the photocatalytic particles are embedded and substantially homogenously distributed in the photocatalytic layer. Preferably, the barrier layer is formed of at least one monolayer of the barrier components. The barrier layer and the photocatalytic layer are preferably transparent.

An area of mixed barrier and photocatalytic particles may be provided between the barrier layer and the photocatalytic layer.

The barrier components may comprise a silicium containing compound such as $SiO_2$, colloidal $SiO_2$, functional nanoscaled $SiO_2$, silicone resin, organofunctional silanes, and/or colloidal silicic acid silane and/or a combination of said compounds. The barrier components may be particles, fibres, oligomers, polymers, etc. The barrier components may have a size in the nano range, for example less than 400 nm such as 300-400 nm. In one embodiment, the barrier components may have a size less than 100 nm.

The concentration of the barrier components in the barrier layer may be at least 70%, more preferably at least 80% and most preferably at least 90%. In one embodiment, the barrier layer substantially consists of the barrier components. By substantially consist is meant that additives and a binder may be present in small amount compared to the amount of the barrier components.

The building panel may be a floor panel, a wall panel, a ceiling panel, a furniture component, etc. The floor panel may be provided with a mechanical locking system at at least one of its edges for vertical and/or horizontal locking to another floor panel. A third aspect of the invention is a building panel produced by the method according the first aspect.

BRIEF DESCRIPTION OF THE DRAWINGS

The present invention will by way of example be described in more detail with reference to the appended schematic drawings, which show embodiments of the present invention.

DETAILED DESCRIPTION

Figure 1:
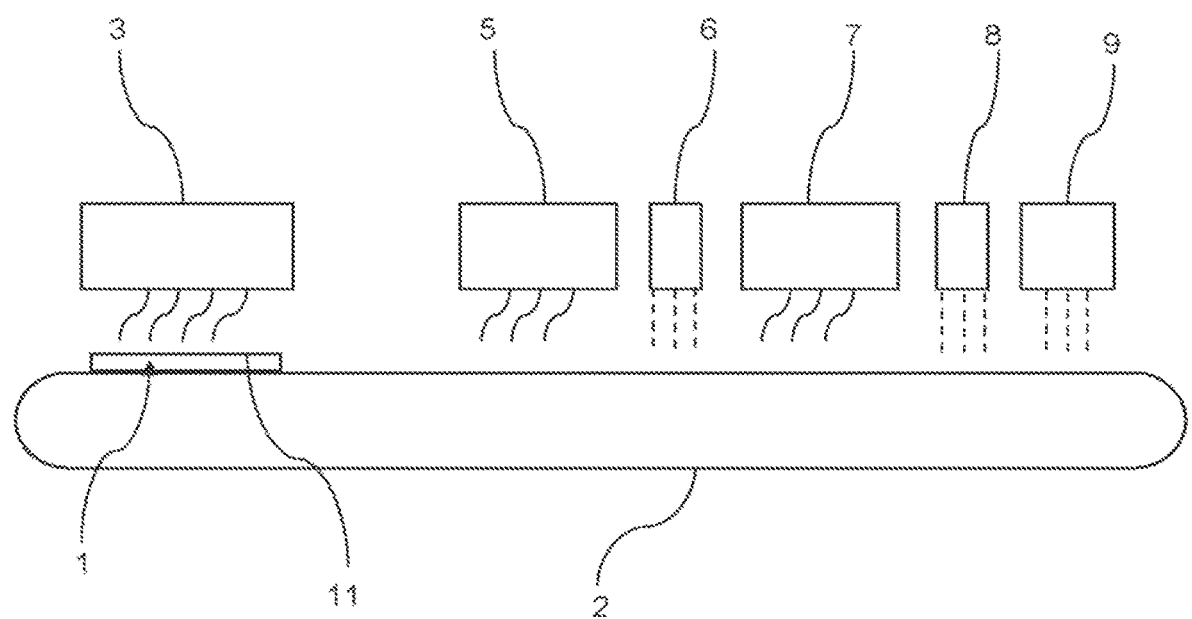
FIG. 1 illustrates a method for coating a building panel according to one embodiment of the invention.

A method for coating a building panel will now be described with reference to FIG. 1. FIG. 1 illustrates a coating process for a building panel in a coating line. The building panel 1 may be a floor panel, a wall panel, a furniture component, etc. The building panel 1 may be solid or may comprise more than one layer, i.e., such as a laminated panel. The first coating fluid is applied on a surface 11 of the building panel 1 adapted to face an interior space of a room, for example as an upper surface of a floor panel. The surface 11 comprises preferably a decorative surface of the building panel. The surface 11 provides the building panel with its decorative properties. The surface 11 of the building panel 1 may comprises a wood-based material such as solid wood, wood veneer, a wood fibre-based board. The decorative surface of the building panel 1 may comprises cork, linoleum, thermoplastic material, thermosetting material, or paper.

The coating line comprises several application apparatuses and a conveyor belt 2 adapted to convey the building panel 1. The conveyor belt 2 preferably conveys the building panel 1 at a constant speed.

In the coating line, a first coating fluid is applied to the surface 11 of a building panel 1 by a coating apparatus 3. The first coating fluid is preferably applied on the surface 11 of the building panel 1 by means of spraying, roller coating, etc. The first coating fluid is preferably uniformly applied to the surface 11 of the building panel 1. The first coating fluid is applied such that at least one coating layer is formed on the surface 11 of the building panel 1. The coating layer is preferably continuous. The coating layer covers preferably the entire surface 11 of the building panel 1. The coating layer may be a lacquer layer or varnish layer. The coating layer is adapted to protect the surface 11 of the building panel, which preferably is a decorative surface. The coating layer is adapted to give the surface 11 wear resistant properties.

The coating layer may comprise one or several layers, for example a base coating layer and a top coating layer. A person skilled in the art realises that also the base coating layer and/or the top coating layer may comprise one or more layers. In FIG. 1, only one coating apparatus 3 is shown. A person skilled in the art appreciates that if more than one layer is to be applied, more than one coating apparatus 3 may be provided or the building panel may pass the coating apparatus 3 more than one time. The base coating layer may be cured before applying a top coating layer.

The coating fluid comprises an organic binder. The organic binder preferably comprises an acrylate or methacrylate monomer or an acrylate or methacrylate oligomer. The acrylate or methacrylate monomer or oligomer may be an epoxy acrylate, an epoxy methacrylate, a urethane acrylate, a urethane methacrylate, a polyester acrylate, a polyester methacrylate, a polyether acrylate, a polyether methacrylate, an acrylic acrylate, an acrylic methacrylate, a silicone acrylate, a silicone methacrylate, a melamine acrylate, a melamine methacrylate, or a combination thereof. In another embodiment, the organic binder comprises an unsaturated polyester.

The above examples are examples of monomers and oligomers polymerised by radical reaction.

The above monomers and oligomers form a component of the coating fluid. The coating fluid may further comprise initiators such as photo-initiators, pigments, fillers, amine synergists, reactive diluents, wetting agent, additives, etc. The coating fluid may be a waterborne, solvent borne, or 100% UV dispersion.

The coating fluid may be a radiation curing coating fluid, preferably UV curing coating fluid or electron beam curing coating fluid. Preferably, the coating fluid comprises a urethane-based acrylate monomer or oligomer.

In one embodiment (not shown), the at least one coating layer may be at least partly cured by a curing device, for example a UV lamp. By partly cured is meant that the coating layer is gelled but not completely cured. If more than one coating layer has been applied to the building panel 1, the underlying coating layers may already have been cured but the uppermost coating layer may be wet or partly cured.

Barrier components are thereafter applied to the building panel 1 by means of an application device 5. The barrier components are adapted to prevent photocatalytic particles from degrading the organic binder of the coating layer. The barrier components comprise silicium containing compound. Examples of such a silicium containing compound are SiO2, colloidal SiO2, functional nanoscaled SiO2, silicone resin, organofunctional silanes, and/or colloidal silicic acid silane and/or a combination of said compounds.

The barrier components are preferably applied as a barrier coating fluid comprising the barrier components. In the shown embodiment, the barrier coating fluid is applied wet-in wet, i.e., the underlying coating layer is not cured before application of the barrier coating fluid. The barrier coating fluid is preferably a waterborne dispersion having the barrier components dispersed therein. The barrier coating fluid may further comprise a wetting agent such as a non-ionic surfactant and/or other additives. The barrier coating fluid may be heat curing. The amount of the barrier coating fluid may be up to about 50 ml/m2, preferably up to about 40 ml/m2, more preferably up to about 30 ml/m2, and most preferably up to about 20 ml/m2. In one embodiment, the amount of said barrier coating fluid applied is up to about 15 ml/m2, up to about 10 ml/m2, up to about 5 ml/m2, up to about 1 ml/m2.

In the shown embodiment, the barrier coating fluid is applied by spraying on the coating layer by a spraying device 5. The size of the droplet of the barrier coating fluid is up to about 200 μm, up to about 150 μm, up to about 100 μm, up to about 50 μm, up to about 25 μm or up to about 10 μm.

The concentration of the barrier components in the barrier coating fluid may be up to about 40 wt %, such as about 30 wt %, preferably up to about 20 wt %, such as about 10 wt %, for example up to about 5 wt %.

The barrier coating fluid forms a barrier layer on the coating layer. If more than one coating layer is provided, the barrier layer is arranged on the top coating layer. Preferably, the barrier layer is at least one monolayer of barrier components. The barrier layer is preferably continuous over the coating layer. The barrier components may be at least partly embedded in the coating layer. The thickness of the barrier layer may be up to about 1 μm, up to about 0.800 μm, up to about 0.600 μm, up to about 0.400 μm, up to about 0.200 μm, up to about 0.100 μm or up to about 0.05 μm.

If the coating layer is not cured before applying the barrier components, or only partly cured or semi-cured, the barrier components may engage with the underlying coating layer. The underlying coating layer and the barrier layer may not be completely separate. A portion where the coating layer and the barrier layer are mixed may be formed.

In a preferred embodiment, the barrier layer is dried before applying the photocatalytic particles. In FIG. 1, a heating apparatus 6, preferably an IR heating apparatus, is arranged after the spraying device 5 adapted to spray the barrier coating fluid.

The concentration of the barrier components in the barrier layer may be at least 70%, more preferably at least 80% and most preferably at least 90%. In one embodiment, the barrier layer substantially consists of the barrier components. By substantially consist is meant that additives and a binder may be present in a small amount compared to the amount of the barrier components.

Photocatalytic particles are thereafter applied on the barrier layer. The photocatalytic particles are preferably photocatalytic nanoparticles, more preferably $TiO_2$. The photocatalytic particles may have a size of less than 100 nm, preferably less than 50 nm, more preferably less than 30 nm, most preferably less than 20 nm, as measured when being present in the photocatalytic coating fluid.

Preferably, the photocatalytic particles are applied as a photocatalytic coating fluid comprising the photocatalytic particles. The photocatalytic coating fluid may be a waterborne dispersion having the photocatalytic particles dispersed therein. The photocatalytic coating fluid may further comprise a wetting agent such as a non-ionic surfactant and/or other additives. The photocatalytic coating fluid may be heat curing. The concentration of the photocatalytic particles may be up to about 30 wt %, up to about 20, wt %, up to about 10 wt %, up to about 5 wt %, or up to about 1 wt %. The amount of the photocatalytic coating fluid applied may be up to about 50 ml/m2, preferably up to about 40 ml/m2, more preferably up to about 30 ml/m2, and most preferably up to about 20 ml/m2. In one embodiment, the amount of the photocatalytic coating fluid applied is up to about 15 ml/m2, up to about 10 ml/m2, up to about 5 ml/m2, up to about to 1 ml/m2.

The photocatalytic coating fluid may comprise an additive such as a wetting agent, preferably a non-ionic surfactant, in a concentration determined relative the concentration of photocatalytic particles in the photocatalytic coating fluid. In the photocatalytic coating fluid, the weight ratio (weight/weight) between the wetting agent such as a non-ionic surfactant and the photocatalytic particles may be 0,01-0,04, preferably 0,02-0,03.

In the shown embodiment, the photocatalytic coating fluid is applied by spraying on the barrier layer by a spraying device 7. The size of the droplet of the photocatalytic coating fluid is up to about 200 µm, up to about 150 µm, up to about 100 µm, up to about 50 µm, up to about 25 µm or up to about 10 µm.

The photocatalytic coating fluid applied forms a photocatalytic layer arranged on the barrier layer. The photocatalytic layer is preferably continuous over the barrier layer. The thickness of the photocatalytic layer may be up to about 1 µm, preferably up to about 0.800 µm, more preferably up to about 0.600 µm, most preferably up to about 0.400 µm, up to about 0.200 µm, up to about 0.100 µm or up to about 0.05 µm.

The underlying barrier layer and the photocatalytic layer may not be completely separated. A portion where the coating layer and the barrier layer are mixed may be formed. An area of mixed barrier and photocatalytic particles may be provided in the border between the barrier layer and the photocatalytic layer. A part of the photocatalytic particles may be partly embedded by the barrier particles in the border between the barrier layer and the photocatalytic layer.

The photocatalytic layer is preferably dried, for example by a heating apparatus 8, preferably an IR heating apparatus, as shown in FIG. 1.

The at least one coating layer, the barrier layer and the photocatalytic layer are then cured in a curing apparatus 9. The coating layer may be completely cured by radiation curing, preferably UV curing or electron beam curing. In the embodiment shown in FIG. 1, the curing apparatus comprises an UV lamp 9 for curing the coating layer. The barrier layer and the photocatalytic layer are completely dried. Thereby, a building panel 1 having photocatalytic properties is obtained. The building panel 1 comprises a surface 11 provided with at least one coating layer, and an overlying layer comprising the barrier layer and the photocatalytic layer.

Figure 2A:
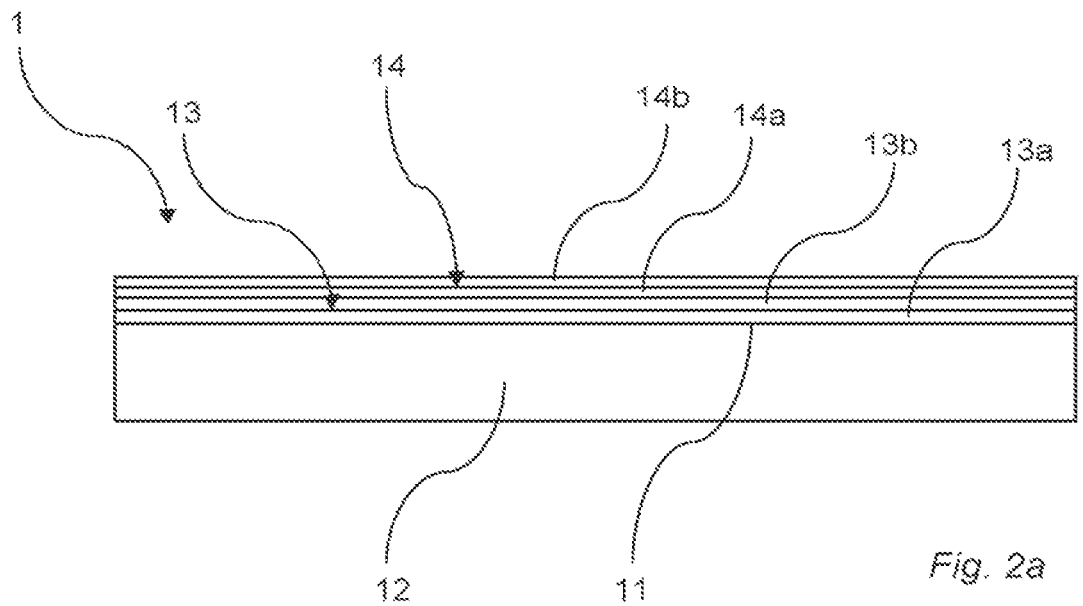
FIG. 2a illustrates a wooden building panel according to one embodiment of the invention.
Figure 2B:
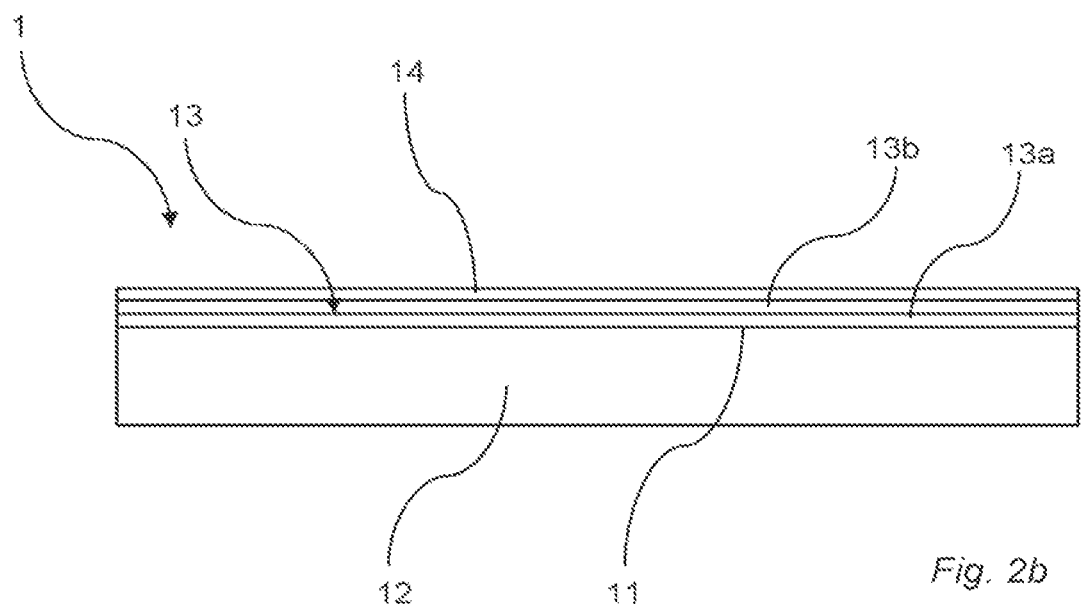
FIG. 2b illustrates a wooden building panel according to one embodiment of the invention.

A building panel 1 having photocatalytic properties will now be described with reference to FIGS. 2a and b. The building panel 1 is preferably coated according to the method described above. The building panel 1 is a wooden panel, for example a wall panel, a floor panel, a furniture component. The building panel 1 may be of solid wood 12 as shown in FIGS. 2a and 2b. Alternatively, the building panel 1 may comprise a core provided with a surface layer of wood, for example a veneer layer (not shown). The building panel 1 may also be a wood-based panel, such as a MDF, HDF, OSB or particleboard. The building panel 1 may be a floor panel.

A surface 11 of the wooden building panel 1 is provided with at least one coating layer 13 and an overlying layer 14, preferably applied by above-described method. The coating layer 13 comprising an organic binder of the above-described type. The coating layer 13 may be a lacquer layer or a varnish layer. Preferably, the coating layer 13 comprises at least one base coating layer 13a and a least one top coating layer 13b as shown in FIGS. 2a and 2b. The coating fluid comprises preferably a urethane-based acrylate. The coating fluid is preferably UV curable.

In FIG. 2a, the overlying layer 14 is arranged on the top coating layer 13. The overlying layer 14 comprises a barrier layer 14a and a photocatalytic layer 14b. The barrier layer 14a comprises barrier components of the above-described type. The barrier layer 14a is arranged on the top coating layer 13b. The photocatalytic layer 14b comprising photocatalytic particles is arranged on the barrier layer 14a. The photocatalytic particles are of the above-described type.

In FIG. 2b, the overlying layer 14 is arranged on the top coating layer 13b. The overlying layer 14 comprises barrier components of the above-described type and photocatalytic particles of the above-described type. The barrier components and the photocatalytic particles are at least partly mixed. The overlying layer 14 comprises a lower part wherein the concentration of the barrier components is higher than the concentration of photocatalytic particles. The overlying layer 14 comprises an upper part wherein the concentration of the photocatalytic particles is higher than the concentration of barrier components. A mixed area may be provided comprising both barrier components and photocatalytic particles.

Figure 3A:
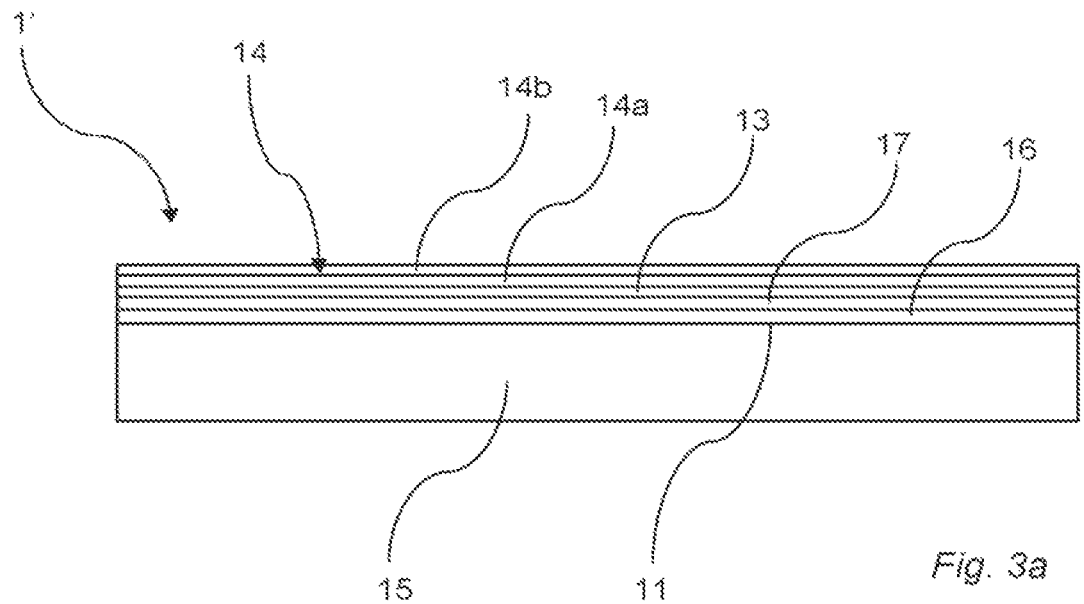
FIG. 3a illustrates a thermoplastic building panel according to one embodiment of the invention.
Figure 3B:
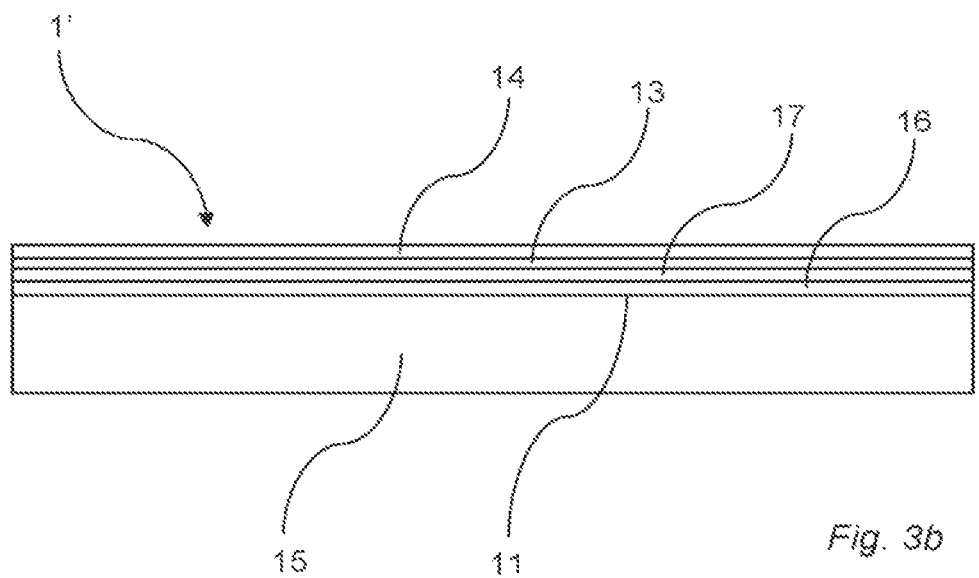
FIG. 3b illustrates a thermoplastic building panel according to one embodiment of the invention.

FIGS. 3a and 3b illustrate a building panel 1 in form of a floor panel 1'. The floor panel 1' is preferably coated according to the above-described method. The floor panel 1' may be a Luxury Vinyl Tile (LVT) or Luxury Vinyl Plank. The floor panel 1' comprises a core 15, at least one surface layer 16, 17, at least one coating layer 13 and an overlying layer 14. A backing layer (not shown) may also be provided on the lower side of the core. The surface layer may comprise a decor layer 16 and a protective layer 17. A person skilled in the art appreciates that layers may be excluded, such as the protective layer and/or decorative layer. The core 15 comprises thermoplastic material. The thermoplastic material may be polyvinyl chloride (PVC) or polypropylene (PP). The core may further comprise a filler, for example calcium carbonate, and additives such as plasticizer, impact modifier, stabilizer, processing aids, pigment, lubricants, etc. Alternatively, the core 15 may be a Wood Plastic Composite (WPC) comprising a thermoplastic binder and wood fibres. The surface layer, such as a décor layer 16 comprises a thermoplastic material such as polyvinyl chloride (PVC), polyester, polypropylene (PP), polyethylene (PE), polystyrene (PS), polyurethane (PUR), or polyethylene terephthalate (PET). The décor layer 16 may further comprise additives such as a plasticizer. The decor layer 16 may be in form of a film or foil. The décor layer 16 preferably has a decorative print printed thereon. The protective layer 17 may be in form of a thermoplastic foil or film. The protective layer 17 comprises a thermoplastic material such as polyvinyl chloride (PVC), polyester, polypropylene (PP), polyethylene (PE), polystyrene (PS), polyurethane (PUR), or polyethylene terephthalate (PET). The protective layer 17 may further comprise additives such as a plasticizer.

The surface layer, for example the decor layer 16 or the protective layer 17, is provided with at least one coating layer 13 and an overlying layer 14, preferably applied by above-described method. The coating layer 13 comprising an organic binder of the above-described type. The coating layer 13 may be a lacquer layer or a varnish layer. The coating layer 13 may comprise at least one base coating layer and a least one top coating layer (not shown). The coating fluid comprises preferably a urethane-based acrylate. The coating fluid is preferable UV curable. It is also contemplated that the coating fluid may be applied directly on the decor layer 16, or directly on the core 15.

In FIG. 3a, the overlying layer 14 is arranged on the coating layer 14. The overlying layer 14 comprises a barrier layer 14a and a photocatalytic layer 14b. The barrier layer 14a comprises barrier components of the above-described type. The barrier layer 14a is arranged on the coating layer 13. The photocatalytic layer 14b comprising photocatalytic particles is arranged on the barrier layer 14a. The photocatalytic particles are of the above-described type.

In FIG. 3b, the overlying layer 14 is arranged on the coating layer 13. The overlying layer 14 comprises barrier components of the above-described type and photocatalytic particles of the above-described type. The barrier components and the photocatalytic particles are at least partly mixed. The overlying layer 14 comprises a lower part wherein the concentration of the barrier components is higher than the concentration of photocatalytic particles. The overlying layer 14 comprises an upper part wherein the concentration of the photocatalytic particles is higher than the concentration of barrier components. A mixed area may be provided comprising both barrier components and photocatalytic particles.

Figure 4A:
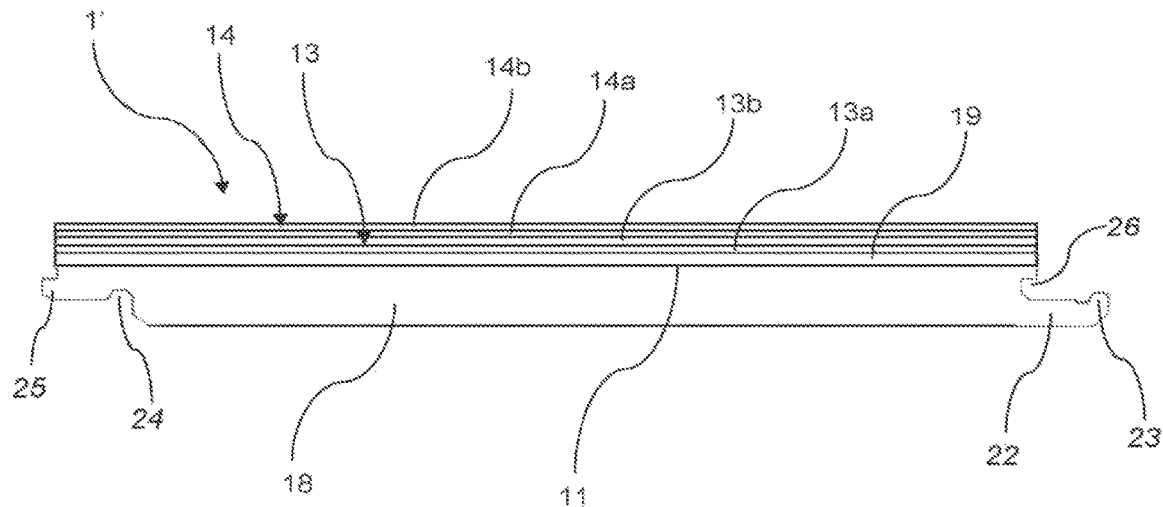
FIG. 4a illustrates a linoleum building panel according to one embodiment of the invention.
Figure 4B:
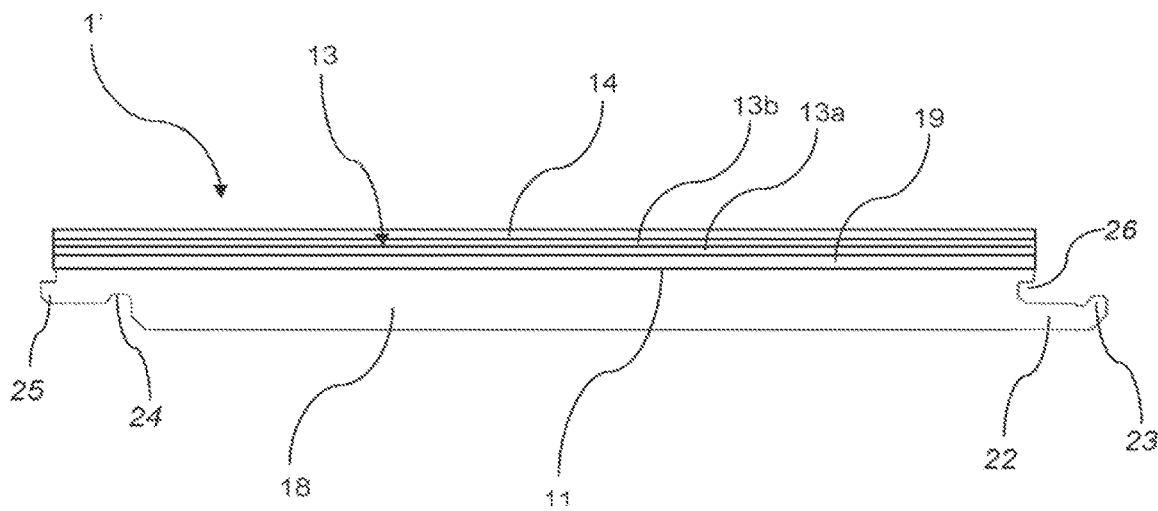
FIG. 4b illustrates a linoleum building panel according to one embodiment of the invention.

FIGS. 4a and 4b illustrate a building panel 1 in form of a floor panel 1'. The floor panel 1' is preferably coated according to the above-described method. The floor panel 1' is a linoleum floor panel. The floor panel 1' may be of solid linoleum, or may be as shown in FIGS. 4a and b comprise a core 18 and a surface layer 19 of linoleum. The core 18 may be a wood-based panel such as MDF or HDF. A backing layer (not shown), for example a cork layer, may be arranged on a lower side of the core. The linoleum surface layer 19 may comprise wood flour, linseed oil, binder, a filler such as calcium carbonate and pigments.

The linoleum surface layer 19 is coated by at least one coating layer 13 and an overlying layer 14 comprising barrier components and photocatalytic particles, preferably by the above-described method. In FIGS. 4a and 4b, the coating layer 13 comprises a base coating layer 13a and a top coating layer 13b. The coating layer 13 comprises an organic binder of the above-described type. The coating layer 13 may be a lacquer layer or a varnish layer. The coating fluid comprises preferably a urethane-based acrylate. The coating fluid is preferable UV curable.

The overlying layer 14 is arranged on top of the top coating layer 13b. In the embodiment shown in FIG. 4a, the overlying layer 14 comprises a barrier layer 14a and a photocatalytic layer 14b. The barrier layer 14a comprises barrier components of the above-described type. The barrier layer 14a is applied on the top coating layer 13b. The photocatalytic layer 14b is applied on the barrier layer 14a. The photocatalytic layer 14b comprises photocatalytic particles of the above-described type.

In FIG. 4b, the overlying layer 14 is arranged on top of the top coating layer 13b. The overlying layer 14 comprises barrier components of the above-described type and photocatalytic particles of the above-described type. The barrier components and the photocatalytic particles are at least partly mixed. The overlying layer 14 comprises a lower part wherein the concentration of the barrier components is higher than the concentration of photocatalytic particles. The overlying layer 14 comprises an upper part wherein the concentration of the photocatalytic particles is higher than the concentration of barrier components. A mixed area may be provided comprising both barrier components and photocatalytic particles.

The floor panel 1' shown in FIGS. 4a and 4b is provided with a mechanical locking system. The floor panel 1' is provided with a mechanical locking system for locking the floor panel 1' to adjacent floor panels horizontally and/or vertically. The mechanical locking system comprises at a first edge of the floor panel a tongue groove 26 adapted to receive a tongue 25 of an adjacent floor panel, and a locking strip 22 provided with a locking element 23 adapted to cooperate with a locking groove 24 of an adjacent floor panel and lock the floor panel 1' in a horizontal direction to the adjacent floor panel. The mechanical locking system further comprises at a second edge a locking groove 24 adapted to receive a locking element 23 of an adjacent floor panel, and a tongue 25 adapted cooperate with a tongue groove 26 of an adjacent floor panel and lock the panel 1' in a vertical direction. The mechanical locking system is formed in the core 18 of the floor panel 1'. Both long side edges and short side edges of the floor panel 1' may be provided with a mechanical locking system. Alternatively, long side edges of the floor panel 1' may be provided with the mechanical locking system for horizontally and vertically locking, and the short side edges may be provided with a mechanical locking system for horizontally locking only. It is also contemplated that other locking systems may be used, for example of the type disclosed in WO2007/015669.

Any of the building panels described above with reference to FIGS. 2a-b and FIGS. 3a-b may be provided with a mechanical locking system as described above with reference to FIGS. 4a and 4b.

It is contemplated that there are numerous modifications of the embodiments described herein, which are still within the scope of the invention as defined by the appended claims. For example, in the figures, said at least one coating layer and the overlying layer are shown as separate layers. However, it is contemplated that the layers may not be present as separate layers and may be at least partly integrated into for example the underlying coating layer.

EXAMPLES

LVT-Reference 1

A coating layer in form of 9 g/m2 of a UV-curing lacquer was applied on a Luxury Vinyl Tile (LVT) comprising a core, a décor layer, and a protective layer. The coating layer was applied on the protective layer. The UV-curing lacquer was cured at a speed of 10 m/min. Two mercury lamps were used both having a light effect of 120 W.

The product produced was put under UV light and checked for hydrophilicity. After 1 week in UV light the product showed a hydrophobic behaviour.

LVT-Reference 2

A coating layer in form of 9 g/m2 of a UV-curing lacquer was applied on a Luxury Vinyl Tile (LVT) comprising a core, a décor layer, and a protective layer. The coating layer was applied on the protective layer. 5 g of a photocatalytic coating fluid comprising 1.5 wt-% nanofluid comprising photocatalytic nanoparticles, wherein the nanofluid is of the type described in patent application WO 2010/110726, and 0.5 wt-% BYK-348 was applied on the UV coating layer. The UV-curing lacquer was cured at a speed of 10 m/min. Two mercury lamps were used both having a light effect of 120 W.

The product produced was put under UV light and checked for hydrophilicity. After 1 week in UV light the product showed a hydrophilic behaviour. However, the product has started to chalk, since the photocatalytic particles have started to degrade the organic binder of the UV-curing coating layer.

LVT—with Barrier Layer and Photocatalytic Layer

A coating layer in form of 9 g/m2 of a UV-curing lacquer was applied on a Luxury Vinyl Tile (LVT) comprising a core, a décor layer, and a protective layer. The coating layer was applied on the protective layer. 5 g of a barrier coating fluid comprising 5 wt-% $SiO_2$ as barrier components was sprayed into the UV-curing lacquer. 5 g of a photocatalytic coating fluid comprising 1.5 wt-% nanofluid comprising photocatalytic nanoparticles, wherein the nanofluid is of the type described in patent application WO 2010/110726, and 0.5 wt-% BYK-348 was applied on the barrier coating. The UV-curing lacquer, the barrier coating fluid and the photocatalytic coating fluid were cured at a speed of 10 m/min. Two mercury lamps were used at 120 W each.

The product produced was put under UV light. After 1 week in UV light the product showed a hydrophilic behaviour with no deterioration of the lacquer.

Linoleum-Reference 1

A base coating layer in form of a 20-30 g/m2 of a UV-curing base coating lacquer was applied on a linoleum floor panel comprising a core and a surface layer of linoleum. The UV-curing base coating lacquer was applied on the surface layer of linoleum. A top coating layer in form of 20-30 g/m2 of a UV-curing top coating lacquer was applied on top of the base coating layer. The UV-curing lacquers were cured at a speed of 10 m/min using an Hg and a Ga lamp at 120 W.

The produced product was put under UV light. After 1 week in UV light the product showed a hydrophobic behaviour.

Linoleum—Reference 2

A base coating layer in form of a 20-30 g/m2 of a UV-curing base coating lacquer was applied on a linoleum floor panel comprising a core and a surface layer of linoleum. The UV-curing base coating lacquer was applied on the surface layer of linoleum. A top coating layer in form of 20-30 g/m2 of a UV-curing top coating lacquer was applied on top of the base coating layer. 5 g of a photocatalytic coating fluid comprising 5 wt-% nanofluid comprising photocatalytic nanoparticles, wherein the nanofluid is of the type described in patent application WO 2010/110726, and 0.5 wt-% BYK-348 on the UV curing lacquer. The UV-curing lacquers were cured at a speed of 10 m/min using an Hg and a Ga lamp at 120 W. The produced product was put under UV light.

After 1 week in UV light the product showed a hydrophilic behaviour. The product has started to chalk, since the photocatalytic particles have started to degrade the organic binder of the UV-curing lacquer.

Linoleum—with Barrier Layer and Photocatalytic Layer

A base coating layer in form of 20-30 g/m2 of a UV-curing base coating lacquer was applied on a linoleum floor panel comprising a core and a surface of linoleum. The UV-curing base coating lacquer was applied on the surface layer of linoleum. A top coating layer in form of 20-30 g/m2 of a UV-curing toping coat lacquer was applied on top of the base coating layer. 5 g of a barrier coating fluid comprising 5 wt-% SiO2 as barrier components was sprayed into the UV-curing lacquer layers. 5 g of a photocatalytic coating fluid comprising 5 wt-% nanofluid comprising photocatalytic nanoparticles, wherein the nanofluid is of the type described in patent application WO 2010/110726, and 0.5 wt-% BYK-348 was applied on the barrier coating. The UV-curing lacquer layers, the barrier coating fluid and the photocatalytic coating fluid were cured at a speed of 10 m/min using a Hg and a Ga lamp at 120 W. After 1 week in UV light the product showed a hydrophilic behaviour with no deterioration of the lacquer.

Wood Panel—Reference 1

A coating layer in form of 9 g/m2 of a UV-curing lacquer was applied on a surface of a wooden building panel. The UV-curing lacquer was cured at a speed of 10 m/min. Two mercury lamps were used both having a light effect of 120 W.

The product produced was put under UV light and checked for hydrophilicity. After 1 week in UV light the product showed a hydrophobic behaviour.

Wood Panel—Reference 2

A coating layer in form of 9 g/m2 of a UV-curing lacquer was applied on a surface of a wooden building panel. 5 g of a photocatalytic coating fluid comprising 1.5 wt-% nanofluid comprising photocatalytic nanoparticles, wherein the nanofluid is of the type described in patent application WO 2010/110726, and 0.5 wt-% BYK-348 was applied on the UV curing lacquer. The UV-curing lacquer was cured at a speed of 10 m/min. Two mercury lamps were used both having a light effect of 120 W.

The product produced was put under UV light and checked for hydrophilicity. After 1 week in UV light the product showed a hydrophilic behaviour. The product has started to chalk, since the photocatalytic particles have started to degrade the organic binder of the UV-curing lacquer.

Wood Panel—with Barrier Layer and Photocatalytic Layer

A coating layer in form of 9 g/m2 of a UV-curing lacquer was applied on a surface of a wooden building panel. 5 g of a barrier coating fluid comprising 5 wt-% SiO2 as barrier components was sprayed into the UV-curing lacquer. 5 g of a photocatalytic coating fluid comprising 1.5 wt-% nanofluid comprising photocatalytic nanoparticles, wherein the nanofluid is of the type described in patent application WO 2010/110726, and 0.5 wt-% BYK-348 was applied on the barrier coating. The UV-curing lacquer, the barrier coating fluid and the photocatalytic coating fluid were cured at a speed of 10 m/min. Two mercury lamps were used at 120 W each.

The product produced was put under UV light. After 1 week in UV light the product showed a hydrophilic behaviour with no deterioration of the lacquer.

EMBODIMENTS

1. A method for coating a building panel (1, 1'), comprising:
    applying a first coating fluid comprising an organic binder on a surface (11) of the building panel (1, 1') to obtain at least one coating layer (13), and
    applying barrier components and photocatalytic particles, preferably TiO2, on said at least one coating layer (13).
2. A method according to embodiment 1, wherein the step of applying the barrier components and the photocatalytic particles comprises:
    applying a barrier coating fluid comprising the barrier components on said at least one coating layer (13) to obtain a barrier layer (14a), and
    applying a photocatalytic coating fluid comprising the photocatalytic particles on said barrier layer (14a) to obtain a photocatalytic layer (14b).
3. A method according to embodiment 1 or 2, wherein the first coating fluid is a radiation curing coating fluid, preferably UV curing coating fluid.
4. A method according to any one of embodiments 1-3, wherein the organic binder comprises an acrylate or methacrylate monomer, or an acrylate or methacrylate oligomer.
5. A method according to embodiment 4, wherein said acrylate or methacrylate monomer or oligomer is an epoxy(meth) acrylate, an urethane(meth) acrylate, a polyester(meth) acrylate, a polyester(meth) acrylate, a polyether(meth) acrylate, an acrylic(meth) acrylate, a silicone(meth) acrylate, a melamine(meth) acrylate, or a combination thereof.

6. A method according to any one of embodiments 1-5, wherein the surface (11) of the building panel (1, 1') comprises solid wood, wood veneer, wood-based board, cork, linoleum, thermoplastic material, thermosetting material, or paper.

7. A method according to any one of embodiments 2-6, further comprising partly curing said at least one coating layer (13), preferably by radiation curing, more preferably by UV curing, prior to applying the barrier components and the photocatalytic particles.

8. A method according to any one of embodiments 2-7, further comprising drying said barrier layer (14a), prior to applying the photocatalytic coating fluid.

9. A method according to any one of embodiments 2-8, further comprising drying said photocatalytic layer (14b).

10. A method according to any one of embodiments 2-9, further comprising curing said at least one coating layer (13), said barrier layer (14a) and/or said photocatalytic layer (14b).

11. A method according to any one of embodiments 2-10, wherein the barrier and/or photocatalytic coating fluid(s) is (are) aqueous fluids.

12. A method according to any one of embodiments 2-11, wherein the barrier and/or photocatalytic coating fluid(s) is (are) applied by spraying.

13. A method according to any one of embodiments 1-12, wherein the barrier components comprise a silicium containing compound such as SiO2, colloidal SiO2, functional nanoscaled SiO2, silicone resin, organofunctional silanes, and/or colloidal silicic acid silane and/or a combination of said compounds.

14. A building panel (1, 1') comprising a surface (11), the building panel comprising: at least one radiation cured coating layer (13) comprising an organic binder, wherein said at least one coating layer (13) is arranged on said surface (11), and at least one overlying layer (14) comprising barrier components and photocatalytic particles, preferably TiO2, wherein barrier components prevent the photocatalytic particles from degrading the organic binder of said at least one coating layer (13), and wherein said at least one overlying layer (14) is arranged on said at least one coating layer (13).

15. A building panel according to embodiment 14, wherein said at least one overlying layer (14) comprises a barrier layer (14a) comprising the barrier components and a photocatalytic layer (14b) comprising the photocatalytic particles, wherein the barrier layer (14a) is arranged between said at least one coating layer (13) and the photocatalytic layer (14b).

16. A building panel according to embodiment 15, wherein an area of mixed barrier and photocatalytic particles is provided between the barrier layer (14a) and the photocatalytic layer (14b).

17. A building panel according to any one of embodiments 14-16, wherein said at least one coating layer is a UV cured coating layer.

18. A building panel according to any one of embodiments 14-17, wherein the organic binder comprises an acrylate or methacrylate monomer, or an acrylate or methacrylate oligomer.

19. A building panel according to embodiment 18, wherein said acrylate or methacrylate monomer or oligomer is an epoxy(meth) acrylate, an urethane(meth) acrylate, a polyester(meth) acrylate, a polyester(meth) acrylate, a polyether(meth) acrylate, an acrylic(meth) acrylate, a silicone(meth) acrylate, a melamine(meth) acrylate, or a combination thereof.

20. A building panel according to any one of embodiments 14-19, wherein the surface (11) of the building panel (1, 1') comprises solid wood, wood veneer, wood-based board, cork, linoleum, thermoplastic material, thermosetting material, or paper.

21. A building panel according to any one of embodiments 14-20, wherein the barrier components comprise a silicium containing compound such as SiO2, colloidal SiO2, functional nanoscaled SiO2, silicone resin, organofunctional silanes, and/or colloidal silicic acid silane and/or a combination of said compounds.

22. A building panel according to any one of embodiments 14-21, wherein the building panel is a floor panel (1').

The invention claimed is:

1. A building panel comprising a surface, the building panel comprising:
   at least one radiation cured coating layer comprising a organic binder, wherein said at least one coating layer is arranged on said surface, and
   at least one overlying barrier layer comprising barrier components, wherein said at least one overlying barrier layer is arranged on said at least one radiation cured coating layer,
   at least one photocatalytic layer arranged on the overlying barrier layer,
   at least one mixed area comprising barrier components and photocatalytic particles between the overlying barrier layer and the photocatalytic layer, wherein the area is defined by a surface of the overlying barrier layer and a surface of the photocatalytic layer, wherein both surfaces face each other and wherein the overlying barrier layer is uncured when the photocatalytic layer is arranged thereon,
   wherein the polymerized organic binder comprises an acrylate or methacrylate monomer, or an acrylate or methacrylate oligomer.

2. A building panel according to claim 1, wherein said at least one radiation cured coating layer is a UV cured coating layer.

3. A building panel according to claim 1, wherein said acrylate or methacrylate monomer or oligomer is an epoxy (meth) acrylate, an urethane(meth) acrylate, a polyester (meth) acrylate, a polyester(meth) acrylate, a polyether (meth) acrylate, an acrylic(meth) acrylate, a silicone(meth) acrylate, a melamine(meth) acrylate, or a combination thereof.

4. A building panel according to claim 1, wherein the surface of the building panel comprises solid wood, wood veneer, wood-based board, cork, linoleum, thermoplastic material, thermosetting material, or paper.

5. A building panel according to claim 1, wherein the barrier components comprise a silicium containing compound.

6. A building panel according to claim 1, wherein the building panel is a floor panel.

7. A building panel according to claim 1, wherein the barrier components comprise SiO2, colloidal SiO2, functional nanoscaled SiO2, silicone resin, organofunctional silanes, and/or colloidal silicic acid silane, and/or a combination thereof.

8. A building panel comprising a surface, the building panel comprising:
- at least one radiation cured coating layer comprising a polymerized organic binder, wherein said at least one coating layer is arranged on said surface, and
- at least one overlying barrier layer comprising barrier components, wherein said at least one overlying barrier layer is arranged on said at least one radiation cured coating layer,
- at least one photocatalytic layer arranged on the overlying barrier layer,
- at least one mixed area comprising barrier components and photocatalytic particles between the overlying barrier layer and the photocatalytic layer, wherein the area is defined by a surface of the overlying barrier layer and a surface of the photocatalytic layer, wherein both surfaces face each other and wherein the overlying barrier layer is uncured when the photocatalytic layer is arranged thereon,
- wherein a size of the barrier components is less than 400 nm.

* * * * *